(12) United States Patent
Chen et al.

(10) Patent No.: US 10,538,658 B2
(45) Date of Patent: Jan. 21, 2020

(54) POLYMER HOLLOW MICROSPHERES AND PREPARATION METHOD AND APPLICATION THEREOF

(71) Applicant: SHENZHEN UNIVERSITY, Shenzhen, Guangdong (CN)

(72) Inventors: Shaojun Chen, Guangdong (CN); Haitao Zhuo, Guangdong (CN); Lijun Lai, Guangdong (CN); Jinghao Yang, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 16/027,254

(22) Filed: Jul. 3, 2018

(65) Prior Publication Data
US 2018/0312681 A1    Nov. 1, 2018

Related U.S. Application Data

(63) Continuation of application No. PCT/CN2016/072807, filed on Jan. 29, 2016.

(51) Int. Cl.
| | |
|---|---|
| *C08L 33/08* | (2006.01) |
| *C08F 2/22* | (2006.01) |
| *C08F 220/18* | (2006.01) |
| *C08F 212/08* | (2006.01) |
| *C08F 220/38* | (2006.01) |
| *C08F 265/06* | (2006.01) |
| *C09D 7/40* | (2018.01) |
| *C08F 257/02* | (2006.01) |
| *C09D 7/65* | (2018.01) |
| *B01J 13/14* | (2006.01) |
| *C09D 151/00* | (2006.01) |
| *C09D 5/33* | (2006.01) |
| *C08K 7/22* | (2006.01) |
| *H01B 3/44* | (2006.01) |

(52) U.S. Cl.
CPC ............. *C08L 33/08* (2013.01); *B01J 13/14* (2013.01); *C08F 2/22* (2013.01); *C08F 212/08* (2013.01); *C08F 220/18* (2013.01); *C08F 220/38* (2013.01); *C08F 257/02* (2013.01); *C08F 265/06* (2013.01); *C09D 5/004* (2013.01); *C09D 7/40* (2018.01); *C09D 7/65* (2018.01); *C09D 151/003* (2013.01); *C08K 7/22* (2013.01); *C08L 2205/18* (2013.01); *C08L 2207/53* (2013.01); *H01B 3/447* (2013.01)

(58) Field of Classification Search
CPC .......... C08L 33/08; C08F 2/22; C08F 220/18; C08F 220/38; C08F 2205/18; C08F 212/08
See application file for complete search history.

(56) References Cited

U.S. PATENT DOCUMENTS

| | | | |
|---|---|---|---|
| 2014/0050845 A1* | 2/2014 | Fung | ........................ B01J 13/14 427/213.34 |
| 2016/0096934 A1* | 4/2016 | Heikkila | ................... B60C 1/00 524/494 |

* cited by examiner

*Primary Examiner* — Robert D Harlan

(57) ABSTRACT

The present invention is applicable to the field of polymer material preparation, and provides a method for preparing polymer hollow microspheres, the steps are as follows: mixing a styrene-based monomer A, an acrylic monomer B, and an acrylate monomer C with a initiator, and reacting to prepare a seed emulsion; maintaining the temperature of the seed emulsion unchanged, mixing the styrene-based monomer A, the monomer C, and a sulfur-containing acrylic monomer D with the initiator, continuously dripping to the seed emulsion, to obtain a product; adding alkaline solution to the product, then adding acid solution, and finally neutralizing, to obtain hollow microspheres.

9 Claims, 5 Drawing Sheets

POLYMER HOLLOW MICROSPHERES AND PREPARATION METHOD AND APPLICATION THEREOF

CROSS-REFERENCE TO RELATED APPLICATIONS

This application is a Continuation Application of PCT Application No. PCT/CN2016/072807, filed on Jan. 29, 2016, the entire contents of which are hereby incorporated by reference.

TECHNICAL FIELD

The present invention relates to the field of polymer material a preparation, and particularly to polymer hollow microspheres and preparation method and application thereof.

BACKGROUND

The thermal insulation and heat preservation materials are important new material associated with people's livelihood science and technology, and reflecting the national comprehensive demonstration projects, wherein the thermal insulation and heat preservation materials for exterior wall have become one of the main products of buildings energy-saving. The reflective thermal insulation coating developed in recent years can actively reflect sunlight energy and bring down the indoor temperature, thus radically cutting back on the usage of air conditioners and greatly reducing the energy consumption. The thermal insulation reflective coating is a new type of functional coating that can effectively block and reflect the radiant solar heat, and bring down temperature of the exterior wall surface and indoor, so as to ameliorate working environment and reduce energy consumption. Among the currently used reflective thermal insulation coatings, the white reflective coating with titanium dioxide as the pigment has become the most widely used thermal insulation material because its reflectance can be up to 80%. However, in practical application, the light or white coating has a shortcoming of poor stain resistance, and the heat reflectivity is decreased greatly after outdoor use for a period of time of resulted in the fouling and discoloration of the coating surface. A large number of studies have shown that inorganic powders such as titanium dioxide are used in heat-insulating reflective coatings due to their high refractive index. Hollow glass microspheres exhibit excellent thermal insulation, also because their reflectivities are directly related to the optical refractive index of the glass component. Studies and calculations have also shown that the greater the refractive index of an object, the greater the reflectivity.

Polymer hollow microsphere refers to polymer hollow microsphere that contains one or more chamber therein, the shell of which is composed of a polymer or polymers, and it is one of the typical products of particle morphology control based on polymer synthesis technology. These hollow microspheres with special characteristics have broad application prospects in nanoreactors, drug controlled release, bioimaging, catalysis, and photonic crystals. If polymer hollow microspheres having a high refractive index can be prepared, and applied to paint preparation will achieve a better thermal insulation reflection effect. However, at present there is no preparing method for high refractive index polymer hollow microspheres domestic and abroad, nor reporting about its application to insulation reflective coatings.

SUMMARY

The technical problem to be solved by the present invention is to provide polymer hollow microspheres and preparation method and application thereof, aiming at obtaining high refractive index polymer hollow microspheres, and applying them to paint preparation to achieve better thermal insulation effect.

A method for preparing polymer hollow microspheres, wherein, the method comprises:

Step 1: mixing a styrene-based monomer A, an acrylic monomer B, and an acrylate monomer C with a initiator, and reacting to obtain a seed emulsion;

Step 2: maintaining the temperature of the seed emulsion unchanged, mixing the styrene-based monomer A, the acrylate monomer C, and a sulfur-containing acrylic monomer D with the initiator, dripping the mixture to the seed emulsion, to obtain a product; and Step 3: adding alkaline solution to the product, then adding acid solution, and finally neutralizing, to obtain hollow microspheres.

Further, the initiator is a water-soluble free radical initiator, and comprises ammonium persulfate, potassium persulfate, or redox initiators.

Further, where in the step 1, the mass ratio of the three substances A, B and C is 20-80: 10-40:10-40, the mass of the initiator is 1 wt %-2 wt % of the total mass of the three substances A, B and C; the reaction temperature is 0-90° C., and reaction time is 3-5 hrs.

Further, where in the step 2, the mass ratio of the three substances A, B, C and D is 10-30: 10-30:40-80; the mass of the initiator is 1 wt %-2 wt % of the total mass of the three substances A, B and C; the reaction temperature is 0-90° C., and reaction time is 3-5 hrs.

Further, the third step specifically comprises: maintaining the temperature at 80-130° C., adding an alkaline solution to the product to adjust the pH of the system to 11.0-14.0, reacting for 1-3 hrs; adding acidic solution, adjusting the pH of the system to 1.0-4.0, reacting for 1-3 hours, then adding alkaline solution to adjust the pH of the system to 6.5-7.5.

Further, the concentration of the alkaline solution is 5-20%, the alkaline solution is KOH or NaOH solution; the concentration of the acidic solution is 5 to 20%, and the acidic solution is hydrochloric acid, sulfuric acid or phosphoric acid solution.

In order to solve the above technical problem, the present invention further provides a hollow polymer microsphere, which is prepared by using the preparation method.

Further, the prepared polymer hollow microspheres have an Abbe index n>1.6, with an aperture ranging from 100 nm to 2000 nm, and a shell thickness ranging from 50 nm to 100 nm.

The present invention further provides applications of the above polymer hollow microspheres, wherein the polymer hollow microspheres are applied in pharmaceutical engineering, catalytic technology, biotechnology, electronic information, material engineering, architectural coatings.

The present invention further provides an insulating reflective coating comprising the polymeric hollow microspheres described.

Compared with the prior art, the invention has the following beneficial effects: the preparation method of the polymer hollow microspheres of the present invention has a simple operation process and is easy to expand production. The polymer hollow microspheres prepared therefrom have a high Abbe refractivity n of greater than 1.6, with a high refractive index. The high-refractive polymer hollow microspheres of the present invention are directly prepared by an aqueous solution polymerization method, and the products can be directly used to configure coatings, and the prepared coatings have excellent heat insulation and heat insulation reflection effect.

DESCRIPTION OF THE EMBODIMENTS

Figure 1:
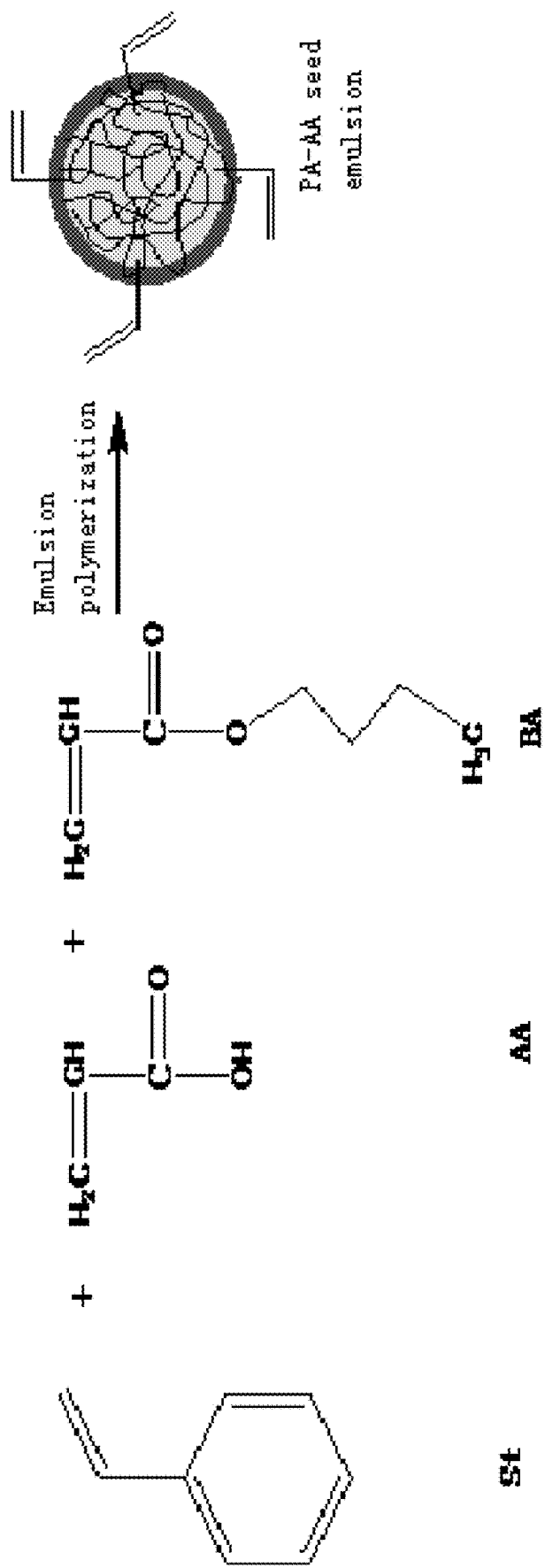
FIG. 1 is a schematic view showing the preparation of a seed emulsion in Example 1.

To make the objectives, technical solutions, and advantages of the present invention clearer, the following describes the present invention in detail with reference to the accompanying drawings and embodiments. It should be understood that the specific embodiments described herein are only for the purpose to explain the present invention, but not to limit the present invention.

Prepare polymer hollow microspheres according to the technical scheme of the present invention as follows:

Step 1: mixing a styrene-based monomer A, an acrylic monomer B, and an acrylate monomer C with a initiator, and reacting to obtain a seed emulsion;

Step 2: maintaining the temperature of the seed emulsion unchanged, mixing the styrene-based monomer A, the acrylate monomer C, and a sulfur-containing acrylic monomer D with the initiator, dripping the mixture to the seed emulsion, to obtain a product; and Step 3: adding alkaline solution to the product, then adding acid solution, and finally neutralizing, to obtain a hollow microsphere.

Specifically, the styrene-based monomer A refers to styrene or a derivative of styrene, and preferably styrene; the acrylic monomer B refers to a monomer having a structural feature of acrylic acid, and preferably acrylic acid and methacrylic acid; the acrylate monomer C refers to a monomer having a structural feature of acrylate, and preferably ethyl acrylate and butyl acrylate; the sulfur-containing acrylic monomer D refers to a monomer having a structural feature of acrylic acid and containing the element sulfur, and preferably thiophenyl methacrylate (TPMA), 4,4'-dimercaptodiphenyl sulfide dimethacrylate (MPSDMA), 2-phenylthioethyl thiolmethacrylate (MEPSMA), and mercaptoethyl sulfide dimethacrylate (MESDMA). The initiator is a water-soluble free radical initiator, and preferably ammonium persulfate, potassium persulfate, or redox initiators.

Specifically, step 1 of the present invention is a process for preparing a seed emulsion, a seed emulsion containing carboxyl groups (monomer B and monomer C) and other unsaturated monomers are subjected to emulsion copolymerization to obtain a carboxyl-containing seed emulsion, which is an acidic core.

Step 2 is the polymerization process of the seed emulsion, it is an acidic nucleus that polymerizes the shell and forms a permeable hard shell, while the seed becomes the core of the latex particles.

The third step is the swelling process of the core. The first is to add lye to swell. Specifically, the seed polymer is swelled by adding lye at the temperature of Tg (vitrification temperature, Tg=80° C.) or greater than Tg of the shell polymer. The lye enters the interior of the seed and neutralizes with the acidic nucleus, resulting in an ionization process that removes the core of the core-shell microspheres. Hydration causes the volume of the shell to expand several times to several dozens times the original, so that the shell is increased by two-dimensional stretching and the shell is expanded accordingly. When the seed volume is expanded to a desired degree, lower the temperature to below the Tg of the shell polymer, the shell cannot be retracted while it is in an expanded state, solidified and frozen. When the water in the particles is volatilized, hollow microspheres are obtained. Add an acid solution to adjust the pH of the system, and process, to form a solid shell structure; finally, add an alkali solution to carry out the neutralization treatment to obtain hollow microspheres.

In the present invention, the copolymerization system has cidic groups, which will inevitably increase the affinity for water, causing the material to be sensitive to humidity, and at the same time easily causing the problems that the polymerization system is easy to flocculate and the core is not easily covered by the shell. Adjusting the amount of initiator to be added, the mass ratio of each reaction raw material, and controlling the reaction temperature and reaction time can avoid the above problems to some extent. In addition, differences in raw materials and quantities thereof, and reaction parameters during the preparation process will affect the structure of the prepared hollow microspheres, which in turn affect performance thereof.

Prepare polymers by using sulfur monomers and benzene ring monomers as raw materials, to obtain hollow polymer microsphere structures, it will not change the physical properties of the polymer. The polymer hollow microspheres prepared by the technical scheme of the present invention have an Abbe index n>1.6, an aperture ranging from 100 nm to 2000 nm, and a shell thickness of 50 nm to 100 nm. The greater the refractive index of the object, the greater the reflectivity. The high-refractive polymer hollow microspheres or microbeads prepared by the present invention have extensive applications in many fields such as pharmaceutical engineering, catalytic technology, biotechnology, electronic information, material engineering, architectural coatings and the like. Especially in coating applications, it has thermal insulation function and thermal insulation reflection function, which can improve the film forming performance and covering performance; it also has the functions of noise absorption and noise reduction. Moreover, since the polymer hollow microspheres have good compatibility with the coating resin, large amount will not affect the film forming performance and glossiness of the coating; therefore, polymer hollow microspheres become an important functional filler for improving the film-forming performance and heat insulation reflection effect of heat-insulating reflective coatings.

The technical solution of the present invention is described as following with reference to specific embodiments.

Example 1

Figure 2:
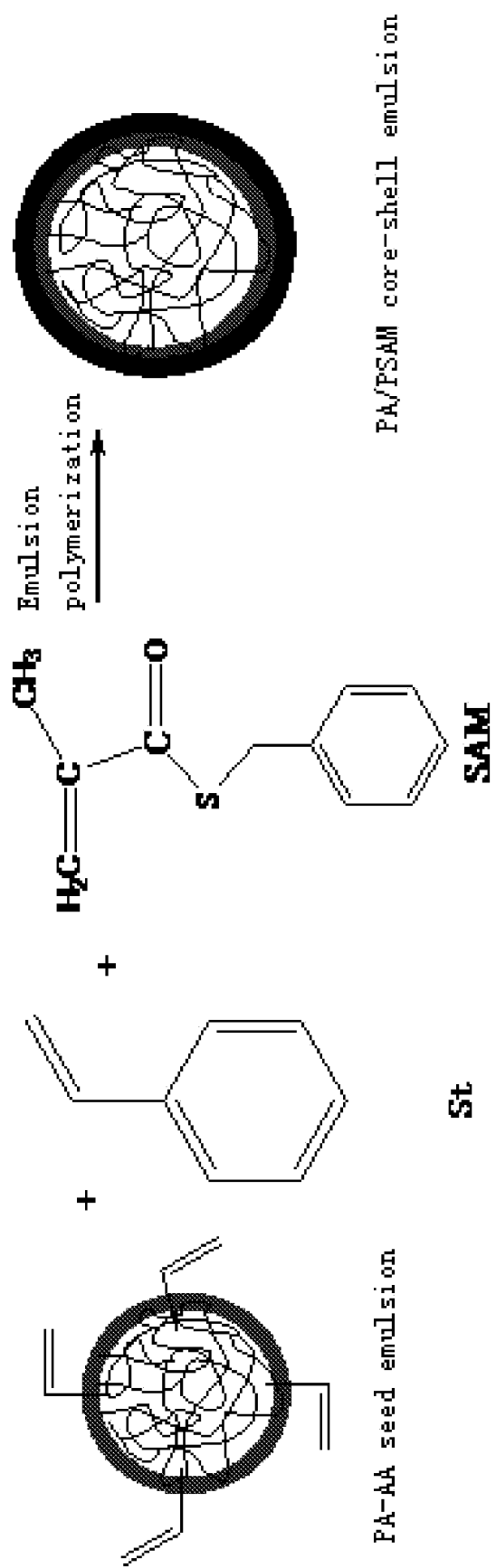
FIG. 2 is a schematic view showing the preparation of an emulsion with core-shell structure in Example 1.
Figure 3:
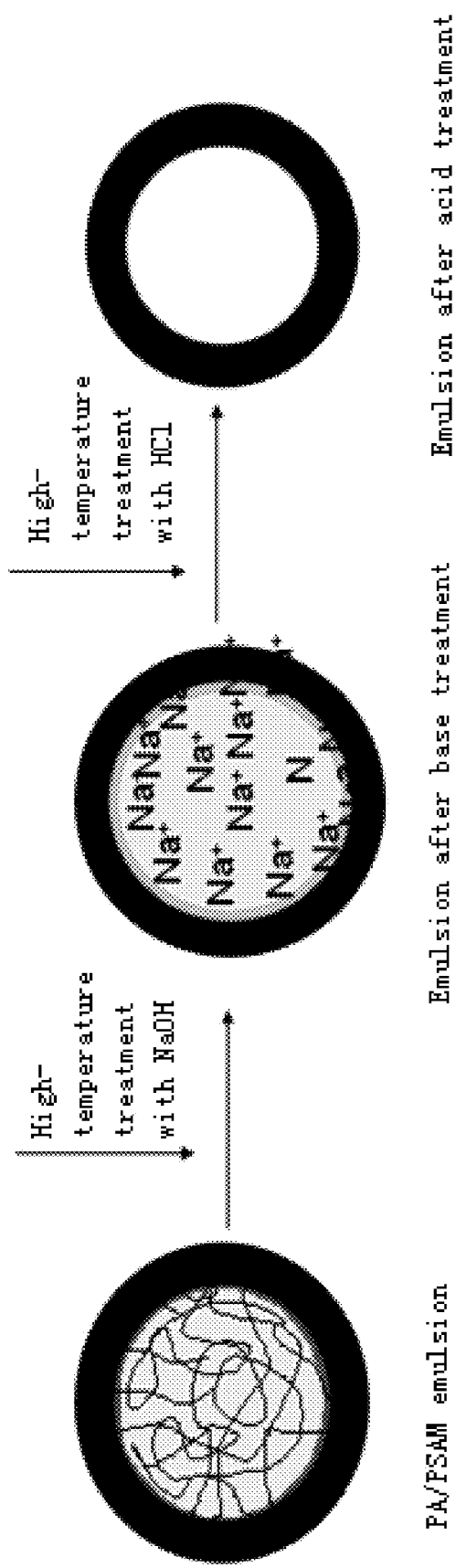
FIG. 3 is a schematic view showing the preparation of polymer hollow microspheres in Example 1.

Mix 60 g of styrene (St), 20 g of acrylic acid (AA), and 20 g of butyl acrylate (BA) uniformly with 1 g of potassium persulfate in 400 ml of deionized water, and react for 3 hrs at 75° C. to obtain a PS-AA seed emulsion (as shown in FIG. 1). Then, maintain the reaction temperature of the seed emulsion unchanged, mix 20 g of styrene, 20 g of butyl acrylate, and 60 g of thiophenyl methacrylate (TPMA) uniformly with 1 g of potassium persulfate in 400 ml of deionized water, continuously drip uniformly to the seed emulsion through a dropping funnel, and continuously react for 3 hrs, to obtain a core-shell structure PS/PSAM microspheres (as shown in FIG. 2). Afterwards, adjust pH of the system to 12 with a 10% KOH solution at 90° C., so the core is removed from the prepared the core-shell structure microspheres after 2-hr treatment. Next, adjust pH of the system to 2.0 with a 10% dilute hydrochloric acid solution, so a solid shell structure is formed after 2-hr treatment, finally neutralize, adjust the pH value to 6.5 with a 10% KOH solution, to obtain hollow microspheres (as shown in FIG. 3).

FIG. 1 is a schematic diagram of a process for preparing a seed emulsion. A carboxyl group-containing monomer acrylic acid (AA) is emulsion-copolymerized with other unsaturated monomers styrene (St) and butyl acrylate (BA) to obtain a carboxyl-containing PS-AA seed emulsion with acidic core. FIG. 2 is a schematic diagram of the preparation of core-shell structure emulsion, polymeric shell on acid core. PS-AA seed emulsion with sulphur-containing acrylic monomer methacrylic acid thiophenol (SAM), and unsaturated monomer styrene (St) perform emulsion polymerization to form a PS/PSAM core-shell emulsion. FIG. 3 shows a schematic diagram of a process of preparing hollow microspheres of a polymer. In a high-temperature state, the NaOH solution is used to treat, the NaOH enters the core shell and ionizes with the acidic core therein to remove the core of the core-shell microspheres. Hydration causes the volume of the shell to expand several times to several dozens times the original, so that the shell is increased by two-dimensional stretching and the shell expands accordingly. Then continue to add hydrochloric acid to treat at high temperature to form a hollow shell with a solid shell structure.

The prepared polymer hollow microspheres have an Abbe index n=2.2, an aperture ranging from 1500 nm to 2000 nm, and a shell thickness of 50 nm to 80 nm. Wherein it is used in coating preparation, the prepared coating has a thermal insulation function and an insulation reflection function, and can improve the film forming performance and the hiding performance; it also has a sound absorption and noise reduction function.

Example 2

Figure 4:
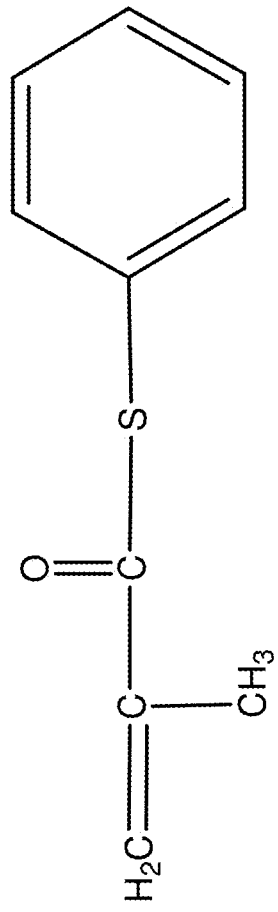
FIG. 4 is a schematic view showing the structure of a sulfur-containing acrylic monomer in Example 2.

Mix 50 g of styrene, 25 g of methacrylic acid, and 25 g of ethyl acrylate were uniformly mixed with 1 g of ammonium persulfate in 400 ml of deionized water, and react for 3 hrs at 65° C., to obtain a seed emulsion. Then, maintain the reaction temperature of the seed emulsion unchanged, mix 30 g of styrene, 20 g of ethyl acrylate, and 50 g of thiophenyl methacrylate (FIG. 4) uniformly with 1 g of ammonium persulfate in 400 ml of deionized water, continuously drip uniformly to the seed emulsion through a dropping funnel, and continuously react for 4 hrs, to obtain a core-shell structure microsphere. Afterwards, adjust pH of the system to 13 with a 10% NaOH solution at 100° C., to remove the core from the prepared core-shell structure microsphere after 3-hr treatment. Next, adjust pH of the system to 2.5 with a 10% dilute hydrochloric acid solution, react for 3 hrs to form a solid shell structure. Finally, neutralize the system by adjusting the pH value to 7.5 with a 10% NaOH solution, to obtain hollow microspheres.

The prepared polymer hollow microspheres have an Abbe index n=2.0, an aperture ranging 1800 nm to 2000 nm, and a shell thickness of 90 nm to 100 nm. Wherein it is used in coating preparation, the prepared coating has a thermal insulation function and an insulation reflection function, and can improve the film forming performance and the hiding performance; it also has a sound absorption and noise reduction function.

Example 3

Figure 5:
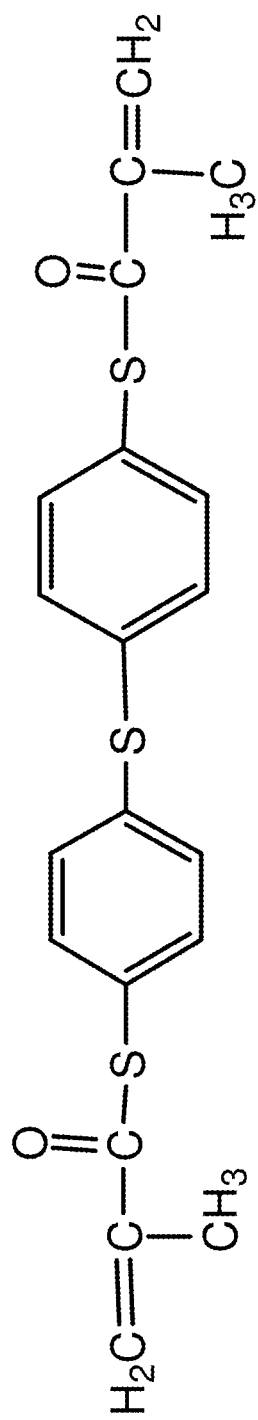
FIG. 5 is a schematic view showing the structure of a sulfur-containing acrylic monomer in Example 3.

Mix 30 g of styrene, 30 g of acrylic acid, and 40 g of ethyl acrylate uniformly with 1.5 g of potassium persulfate in 400 ml of deionized water, and react for 3 hrs at 80° C., to obtain a seed emulsion. Then, maintain the reaction temperature of the seed emulsion unchanged, mix 30 g of styrene, 20 g of ethyl acrylate, and 50 g of 4,4'-dimercaptodiphenyl sulfide dimethacrylate (FIG. 5) uniformly with 1 g of ammonium persulfate in 200 ml of deionized water, continuously drip uniformly to the seed emulsion through a dropping funnel, and continuously react for 3 hrs, to obtain a core-shell structure microsphere. Afterwards, adjust pH of the system to 12.5 with a 10% KOH solution at 95° C., react for 5 hrs to remove the core from the prepared core-shell structure microspheres. Next, the system was adjusted to pH 2.0 with a 10% sulphuric acid solution, so a solid shell structure is formed after 5-hr treatment. Finally, neutralize the system by adjusting the pH value to 7.0 with a 10% KOH solution, to obtain hollow microspheres.

The prepared polymer hollow microspheres have an Abbe index n=1.7, an aperture ranging from 100 nm to 200 nm, and a shell thickness of 50 nm to 70 nm. Wherein it is used in coating preparation, the prepared coating has a thermal insulation function and an insulation reflection function, and can improve the film forming performance and the hiding performance; it also has a sound absorption and noise reduction function.

Example 4

Figure 6:
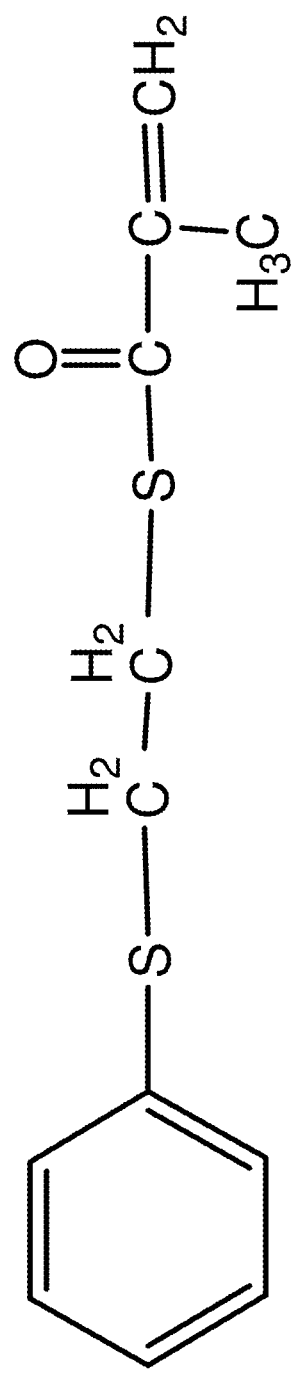
FIG. 6 is a schematic view showing the structure of a sulfur-containing acrylic monomer in Example 4.

Mix 70 g of styrene, 15 g of methacrylic acid, and 15 g of ethyl acrylate uniformly with 1.8 g of ammonium persulfate in 400 ml of deionized water, and react for 3 hrs at 65° C., to obtain a seed emulsion. Then, maintain the reaction temperature of the seed emulsion unchanged, mix 30 g of styrene, 20 g of ethyl acrylate, and 50 g of 2-phenylthioethyl thiolmethacrylate (FIG. 6) uniformly with 1 g of ammonium persulfate in 500 ml of deionized water, continuously drip uniformly to the seed emulsion through a dropping funnel, and continuously react for 5 hrs, to obtain a core-shell structure microsphere. Afterwards, adjust pH of the system to 12 with a 10% NaOH solution at 100° C., react for 5 hrs to remove the core was removed from the prepared core-shell structure microspheres. Next, adjust pH of the system to 2.0 with a 10% sulphuric acid solution, react for 5 hrs to form a solid shell structure. Finally, neutralize the system by adjusting the pH value to 7.0 with a 10% KOH solution, to obtain hollow microspheres.

The prepared polymer hollow microspheres have an Abbe index n=2.6, an aperture ranging from 300 nm to 500 nm, and a shell thickness of 50 nm to 60 nm. Wherein it is used in coating preparation, the prepared coating has a thermal insulation function and an insulation reflection function, and can improve the film forming performance and the hiding performance; it also has a sound absorption and noise reduction function.

Example 5

Figure 7:
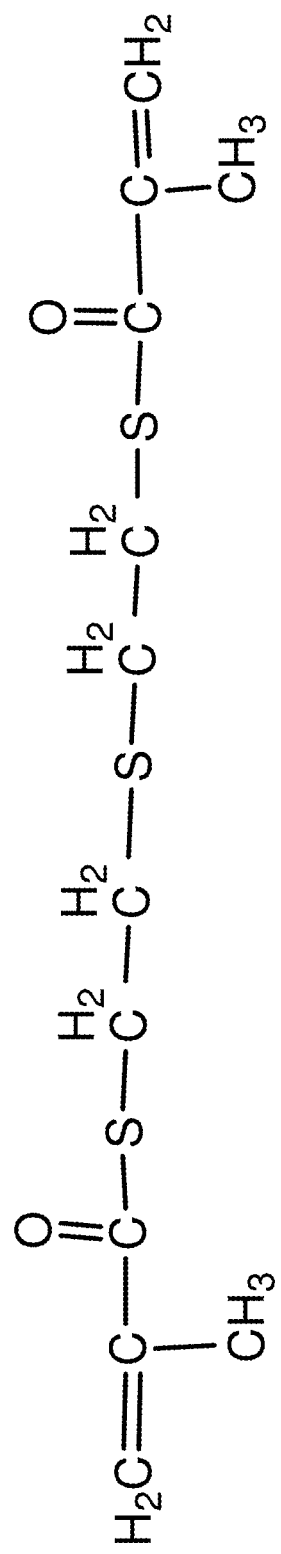
FIG. 7 is a schematic view showing the structure of a sulfur-containing acrylic monomer in Example 5.

Mix 50 g of styrene, 30 g of methacrylic acid, and 20 g of ethyl acrylate uniformly with 1 g of potassium persulfate in 500 ml of deionized water, and react for 3 hrs at 75° C., to obtain a seed emulsion. Then, maintain the reaction temperature of the seed emulsion unchanged, mix 20 g of styrene, 30 g of ethyl acrylate, and 50 g of mercaptoethyl sulfide dimethacrylate (having a structure as shown in FIG. 7) uniformly with 1 g of ammonium persulfate in 500 ml of deionized water, continuously drip uniformly to the seed emulsion through a dropping funnel, and continuously react for 5 hrs, to obtain a core-shell structure microsphere. Afterwards, adjust pH of the system to 13 with a 10% KOH solution at 100° C., react for 5 hrs to remove the core from the prepared core-shell structure microspheres. Next, adjust pH of the system to 2.5 with a 10% dilute hydrochloric acid solution, react for 4 hrs to forma solid shell structure. Finally, neutralize the system by adjusting the pH value to 7.0 with a 10% KOH solution, to obtain hollow microspheres.

Control

The prepared polymer hollow microspheres have an Abbe index n=1.62, an aperture ranging from 800 nm to 1000 nm, and a shell thickness of 80 nm to 100 nm. It is used in coating preparation applications. The prepared coating has a thermal insulation function and an insulation reflection function, and can improve the film forming performance and the hiding performance; it also has a sound absorption and noise reduction function.

The same thermal insulation and heat-shielding reflective performance tests were performed on the coatings that were completely the same as the other components of the examples except that the polymer hollow microspheres were not added.

Table 1 shows the related performance test results of the coatings prepared in Examples 1 to 5 and control.

TABLE 1

|  | Example 1 | Example 2 | Example 3 | Example 4 | Example 5 | Control |
|---|---|---|---|---|---|---|
| Thermal conductivity, (W/m · ° C.) | 0.1 | 0.15 | 0.08 | 0.1 | 0.05 | 0.3 |
| Heat reflectivity, % | 0.85 | 0.8 | 0.9 | 0.95 | 1.0 | 0.65 |

The foregoing descriptions are merely preferred embodiments of the present invention and are not intended to limit the present invention. Any modification, equivalent replacement and improvement made within the spirit and principle of the present invention shall be encompassed in the scope of the protection of the present invention.

What is claimed is:

1. A method for preparing polymer hollow microspheres, wherein, the method comprises:
    Step 1: mixing a styrene-based monomer A, an acrylic monomer B, and an acrylate monomer C with an initiator, and reacting to obtain a seed emulsion;
    Step 2: maintaining the temperature of the seed emulsion unchanged, mixing the styrene-based monomer A, the acrylate monomer C, and a sulfur-containing acrylic monomer D with the initiator, dripping the mixture to the seed emulsion, to obtain a product; and
    Step 3: adding alkaline solution to the product, then adding acid solution, and finally neutralizing obtained mixture by adding alkaline solution, to obtain hollow microspheres.

2. The preparing method according to claim 1, wherein the initiator is a water-soluble free radical initiator, and comprises ammonium persulfate, potassium persulfate, or redox initiators.

3. The preparing method according to claim 1, wherein the step 1, the mass ratio of styrene-based monomer A to acrylic monomer B to acrylate monomer C is 20-80: 10-40: 10-40, the mass of the initiator is 1 wt %-2 wt % of the total mass of the styrene-based monomer A, acrylic monomer B and acrylate monomer C; the reaction temperature is 0-90° C., and reaction time is 3-5 hrs.

4. The preparing method according to claim 1, wherein the third step specifically comprises: maintaining the temperature at 80-130° C., adding an alkaline solution to the product to adjust the pH of the system to 11.0-14.0, reacting for 1-3 hrs; add acidic solution, adjust the pH of the system to 1.0-4.0, react for 1-3 hours, then add alkaline solution to adjust the pH of the system to 6.5-7.5.

5. The preparing method according to claim 4, wherein the concentration of the alkaline solution is 5-20%, the alkaline solution is KOH or NaOH solution; the concentration of the acidic solution is 5 to 20%, and the acidic solution is hydrochloric acid, sulfuric acid or phosphoric acid solution.

6. Polymer hollow microspheres, wherein they are prepared by using the method of claim 1.

7. The polymer hollow microspheres according to the claim 6, the prepared polymer hollow microspheres have an Abbe index n>1.6, with an aperture ranging from 100 nm to 2000 nm, shell thickness ranging from 50 nm to 100 nm.

8. The polymer hollow microspheres according to the claim 6, wherein the polymer hollow microspheres are applied in pharmaceutical engineering, catalytic technology, biotechnology, electronic information, material engineering, architectural coatings.

9. An insulating reflective coating comprises the polymeric hollow microspheres according to claim 6.

* * * * *